United States Patent [19]

Reynolds et al.

[11] 4,291,492
[45] Sep. 29, 1981

[54] TREE SLASHING APPARATUS

[75] Inventors: Ellis W. Reynolds; Edward R. Joyce, both of Jacksonville, Fla.

[73] Assignee: SCM Corporation, New York, N.Y.

[21] Appl. No.: 95,316

[22] Filed: Nov. 19, 1979

[51] Int. Cl.³ .............................................. A01G 23/10
[52] U.S. Cl. ........................................ 47/12; 47/1.7; 30/379.5; 144/2 Z
[58] Field of Search ............................ 47/10–12, 47/8, 57.5, 1, 1.7; 144/2 Z; 30/379.5

[56] References Cited

U.S. PATENT DOCUMENTS

| 2,032,688 | 3/1936 | Dart | 47/8 X |
| 2,725,674 | 12/1955 | Burney | 47/12 |
| 3,565,143 | 2/1971 | Wehr | 144/2 Z X |
| 3,879,888 | 4/1975 | Riley | 47/1.7 X |
| 3,959,925 | 6/1976 | Sanders | 47/12 |
| 4,063,359 | 12/1977 | Luscombe | 30/379.5 |
| 4,090,328 | 5/1978 | Enos | 47/12 |

FOREIGN PATENT DOCUMENTS 478588  10/1975  U.S.S.R. .................. 47/12

Primary Examiner—Robert E. Bagwill
Attorney, Agent, or Firm—Robert A. Sturges; Merton H. Douthitt

[57] ABSTRACT

An apparatus for a wheeled vehicle for slashing pine trees to enhance the production by natural means of terpenoid materials, and comprising a tree slashing device pivotally mounted at the end of an arm extending from the vehicle, and irritant applicator also carried on said tree slashing device for applying an irritant material to the freshly slashed wound in the stem of the tree.

6 Claims, 4 Drawing Figures

TREE SLASHING APPARATUS

BACKGROUND OF THE INVENTION AND PRIOR ART

The present invention relates to apparatus useful in slashing or streaking pine trees to enhance the natural production of terpene products in the body of the tree prior to harvesting.

It has been known for over 30 years that the inflicting of a wound or slash through the bark on pine trees causes an increase in the production of oleoresin material in both directions along the stem from the site of the wound. For example, the yield of oleoresins and rosin can be increased from 500 to 600 percent; the yield of fatty acids can be increased from 20 to 40 percent; and such wounding favors the formation of the valuable product b-pinene as well as turpentine.

In the past, the practice has been to strip the bark from the tree along a slash from about $\frac{1}{8}$ of an inch to an $1\frac{1}{2}$ in width, and for a distance of about $\frac{1}{3}$ to $\frac{1}{2}$ the circumference of the tree. The wound may extend to the cambium layer or inwardly thereof. Until recently, the wound has been treated with an aqueous solution of sulfuric acid (40%) or a sulfuric acid paste resulting in a remarkable increase in the yield of oleoresinous materials. Reference may be had to the Journal of the Technical Association of the Pulp and Paper Industry, (TAPPI), Volume 39, Jan. 1956, Pages 55-59.

More recently, it has been found that the application of certain herbicides, and particularly Paraquat (1,1dimethyl-4,4-bipyridylium dichloride) at from about 2% to about 8% concentration in solution is a very effective means of enhancing the production of such terpenoid materials. Reference may be had to the Journal of the Technical Association of the Pulp and Paper Industry, Volume 60, Pages 54–57 , June 1977 for further details on the treatment of slash pine with Paraquat. Other compositions, such as, insecticides, dye marker solution, or the like may be applied to the tree in this manner.

So far as it is presently known, slashing of pine trees has been done by hand followed by hand application to the relatively fresh wound of an irritant, such as, a herbicide, e.g., Paraquat in relatively dilute solution or dispersion. The average output per day per man has been about 1,000 trees by this method.

The present invention provides a mechanical means for pine tree slashing and enables the slashing and virtually simultaneous treatment of pine trees at a rate from 6,000 to 7,000 trees per day per operating unit.

As is common practice, pine trees are planted in groves in parallel rows about 6 to 11 feet apart, with the individual trees in a given row being about 8 feet apart and in staggered relation to the trees in an opposite row. Huge areas in southeastern United States are utilized for the growth and harvesting of pine trees used mainly in the production of paper pulp.

It has now been found that apparatus may be attached to an automotive wheeled vehicle, such as, a tractor, to effect slashing by automatic means followed by virtually immediate treatment of the wound with an irritant material, such as, described above. Such an apparatus capable of operating on trees on each side of the tractor and moving at a speed of from half to 2.5 mph is capable of slashing and treating up to 7,000 trees per day.

BRIEF STATEMENT OF THE INVENTION

Briefly stated, therefore, the present invention is an improved tree slashing and treating apparatus carried by a wheeled vehicle and comprising means for slashing a tree to remove a substantially arcuate strip of bark and expose an under bark portion of the tree, and applicator means actuated by contact with the tree for applying a treating agent to said exposed under bark portion. In more specific embodiments of the invention, the tree slashing apparatus includes an endless chain having debarking means carried on the outer surface thereof. The debarking chain is pivotally mounted at the distal extremity of an extensible arm which is in turn attached to the wheeled vehicle. Desirably, the arm is laterally extendable to accommodate different spacing between the rows of trees. Means are provided to drive the endless chain members. The endless chain members are pivotally mounted on the distal extremity of the laterally extending arm or arms for rotation in a substantially horizontal plane. As the chain engages the tree trunk and strips the bark therefrom, the chain supporting mechanism is pivoted about the vertical pivot pin in a reverse direction to enable the device to pass the tree. Spring means are provided to return the chain carrying member to the lateral or tree engaging position.

Also, provided with the tree engaging and chain holding member are means to actuate a sprayer for depositing the treating composition, e.g., a dilute Paraquat solution with or without a dye for indicating treatment into the freshly cut wound.

BRIEF DESCRIPTION OF THE DRAWINGS

The present invention may be better understood by having reference to the annexed drawings illustrating a preferred embodiment of the present invention and wherein.

DETAILED DESCRIPTION OF THE DRAWINGS

Figure 1:
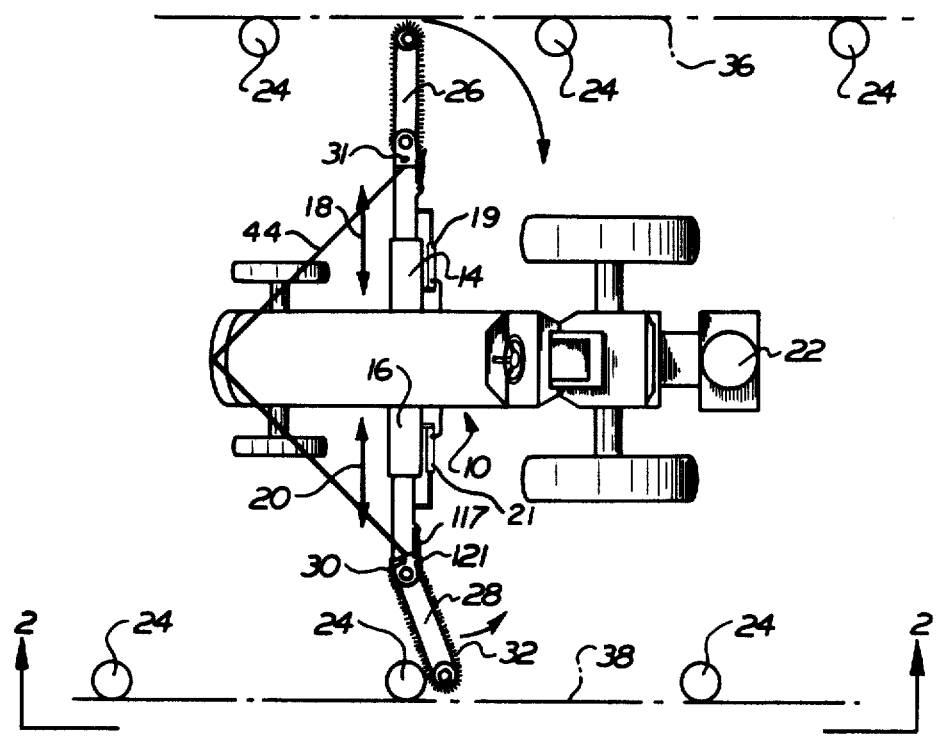
FIG. 1 is a top plan view of a tractor carrying a preferred form of an improved tree slashing and treating apparatus in accordance with the present invention.
Figure 2:
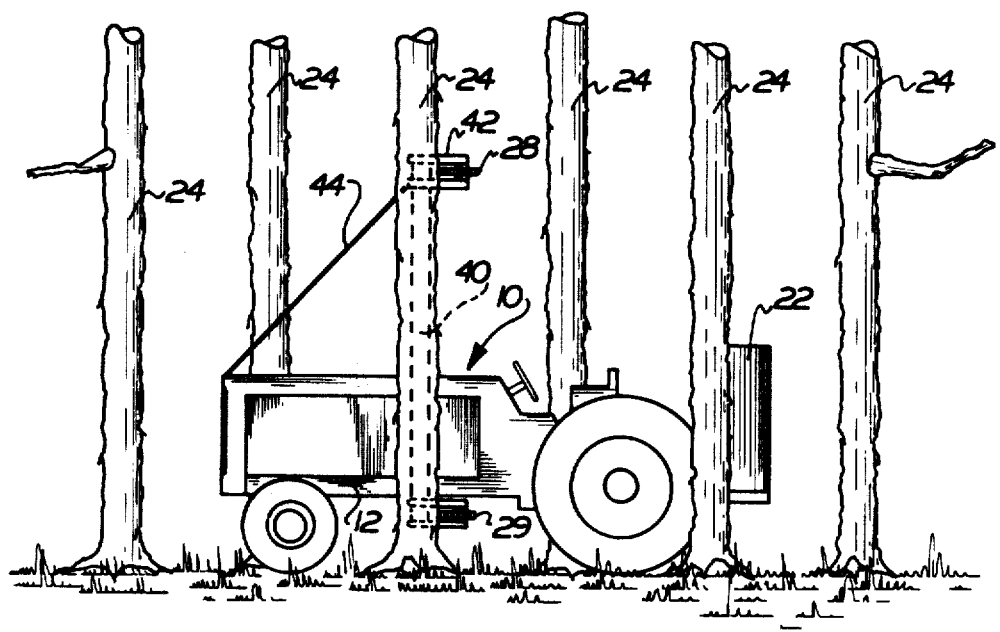
FIG. 2 is a side view of the apparatus shown in FIG. 1.

FIGS. 1 and 2 show in top plan and side elevation, respectively, a preferred embodiment of the present invention. Accordingly, there is provided a tractor 10 of conventional design and structure. Suspended from the bottom of the tractor frame 12 are laterally extending arms 14 and 16. The laterally extending telescoping arms 14 and 16 are mounted so as to be adjustable bidirectionally as indicated by the arrows 18 and 20, respectively. Any suitable mounting means may be used, and lateral adjustment may be achieved by hydraulic cylinder means, the installation and operation of which is well known, may be used to extend and retract the laterally extending telescoping arms 14 and 16. Also, shown in FIGS. 1 and 2 is a supply container 22 in which the tree treating solution or dispersion is conveniently carried.

As shown in FIG. 1, the pine trees 24 are in parallel rows from about 6 to about 11 feet apart, and the trees 24 in opposing rows are desirably in staggered relationship. The device of the present invention may be designed to slash each tree twice, one wound being inflicted at an elevation of from 6 to 12 inches above the ground, and another at from 5 to 6 feet above the ground. To this end, there is provided at the distal extremity of the extendable arms 14 and 16 respectively, tree wounding devices 26 and 28. As clearly shown in FIG. 1, the devices 26 and 28 are pivotally mounted on distal extremities of the telescoping arms 14 and 16 so that as the tractor 10 passes a given tree 24, the device 28 is restrained against forward motion by contact with the tree trunk and pivoted around the pivot point 30. During such contact, the endless chain 32 with projections 50 extending therefrom courses around the inner side 34 of the tree 24 and slashes the bark from the tree through an arc of from approximately 120° to about 180° to expose the under bark portion of the tree, e.g., the cambium layer, or if deeper, the xylem. When the device 10 has passed the tree 24, and the arm 28 is clear of the tree, it returns to a normal outward extension illustrated in FIG. 1 by the element 26. Any suitable spring means can be provided to return the slashing element 26 to a neutral position ready for interception by a succeeding tree 24. Clearly, the adjustment of lateral extension of the telescoping arms 14 and 16 will be such that the outward extent of the elements 26 and 28 is such as is to promote interception by the trees 24, sequentially, and reverse bending of the respective tree slashing elements 26 and 28 as the device 10 passes successively each intercepted tree. Thus, the pivot points 30 and 31 should be located well within the tree lines 38 and 36, respectively.

As indicated above, it is desirable although not essential to slash each tree at two vertically spaced points. To the accomplishment of this end, each laterally extending telescoping arm 14 and 16 is provided with a vertically disposed post 40, the upper end of which is fitted with a suitable bracket 42 for supporting the slashing member 28. The second tree slashing member on the same side of the tractor assembly 10 is a slashing element 29 disposed from 6 to 12 inches above the ground. As indicated above, the slashing element 28 is disposed from 5 to 6 feet above the ground. Suitable support and stay members may be provided such as guy cable 44.

Figure 3:
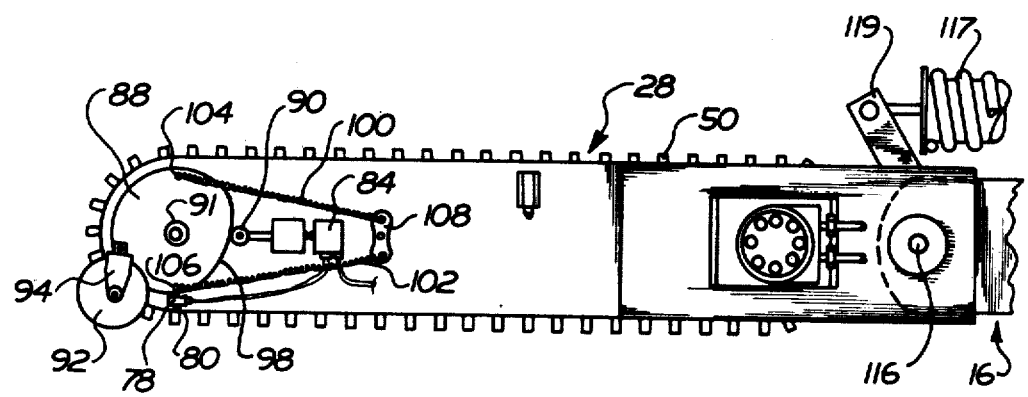
FIG. 3 is a top plan view of an endless chain tree slashing device adapted to be pivotally mounted to the distal end of a laterally extending arm.
Figure 4:
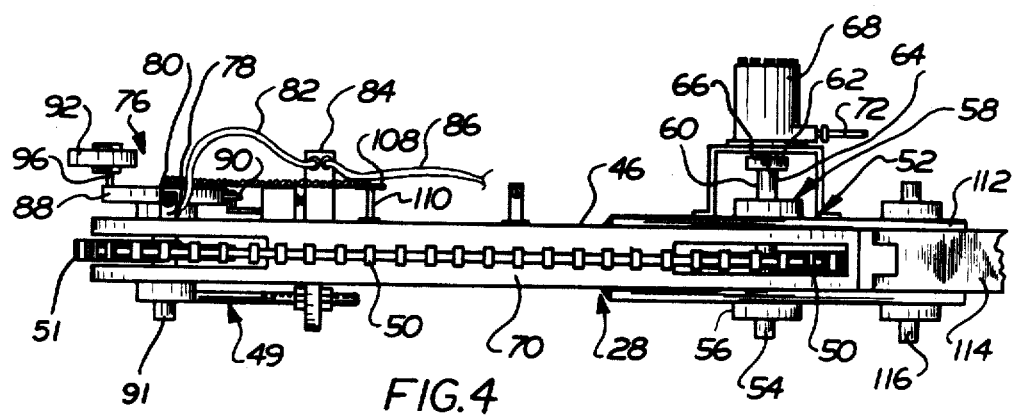
FIG. 4 is a side elevation of the structure shown in FIG. 3.

Referring now more particularly to FIGS. 3 and 4 there is here shown a typical tree streaking element 28 in top and in side elevation. The tree slashing element 28 consists of a substantially horizontally disposed chain guide bar 46 defining a channel in which a movable endless chain or belt 48 is carried. Chain tensioning means of known structure and such as illustrated at 49, may be located on the bottom of the chain guide bar, or on the top, as desired. The endless chain 48 is provided with lugs 50 at spaced intervals therealong which lugs are cutting elements for removing bark to at least the cambium layer. The elements 50 do not require the characteristics of saw teeth as used in a chain saw, although, chain saw elements 50 may be used if desired. The elements or lugs 50 are not required to be sharp. The chain guide bar 46 is conveniently provided with rotatable chain engaging sprockets 50 and 51 at the ends thereof. At the proximal extremity 52, the sprocket is carried on a shaft 54 suitably bearinged and supported in bosses 56 and 58. An extension 60 of the shaft 54 is provided with an integral terminal disc or flange 62 having a keyway 64 diametrally formed in the upper surface thereof. The keyway 64 is adapted to receive a key 66 carried on the output shaft of a conventional hydraulic motor 68. A suitable coupling between the motor and the driven sprocket shaft 54 may be used. The hydraulic motor 68 provides the driving force for moving the chain 48 along the channel 70 in the chain guide bar 46. Hydraulic fluid is supplied to the motor 68 through the hydraulic lines 72 and 74.

The distal extremity 76 of the tree slashing member 28 is provided with apparatus for automatically actuating and deactuating a spray device for deposition of an irritant material into the freshly created wound in the tree. Thus, in the preferred embodiment there is provided a spray head 78 with one or more nozzles 80 disposed for directing irritant into the wound created by the endless chain 48 carrying lugs 50. The spray head 78 is supplied from a feed line 82 leading from a valve member 84 which in turn is feed through inlet line 86 from the supply tank 22 carried conveniently behind the driver of the tractor structure 10. The valve 84 is a conventional normally closed fluid valve which can be turned to an open or closed position by means of a cam structure 88 coacting with a cam follower 90 adapted to actuate the valve 84. The cam 88 is mounted for rotation on the distal sprocket carrying shaft 91 and rotates freely with respect to such shaft 91. For moving the cam, there is provided a tree engaging wheel 92 carried in a fork or caster bracket 94 which is in turn fixedly mounted by means of pin 96 to the cam 88. Thus, as tree engaging wheel 92 contacts the tree, the cam 88 is caused to rotate about the axle or shaft 91 whereby the cam follower 90 is caused to move along the cam profile 98 and actuate the valve 84 to the "on" position when delivery of fluid through the nozzle 80 commences. To return the cam 88 to the "off" position, there is provided a pair of stabilizing springs 100 and 102 attached to the cam 88 at spring receiving holes 104 and 106, respectively, located at transverse, diametrically opposed points. The opposite ends of the springs 100 and 102 are anchored in a fixed spring retaining bracket 108 which is in turn anchored to the chain guide bar 46 by the pin 110. As the cam 88 is rotated clockwise, for example, from the position shown in FIG. 3, tension in spring 102 is increased, and in spring 100, tension is decreased. The difference in spring tension will return the cam 88 to the neutral "off" position and spraying of fluid ceases.

In order to allow the tree streaking member 28 to pivot, the outer end of the laterally extending arm 16, for example, is provided with a member or tongue 112 adapted to receive the bifurcated member 114 which is integral with the chain guide bar 46. Pivoting occurs about the pin 116. Suitable return means are provided to neutralize the position of the tree streaking elements, such as, element 28. To this end, a spring and shock absorber assembly 117 biased between a spring stop 119 (FIG. 1) carried by the extensible arm 16 and a projecting arm 121 carried by the proximal end of the element 28 (FIG. 3) is used to return the element 28, for example, to a stable neutral position. Any suitable means for returning the tree streaking element, such as, element 28, to the neutral position may be employed for this purpose.

The manner of using the device of the present invention is believed evident from the annexed drawings. However, to utilize the device, a suitable irritant solution, such as, those described in the aforementioned prior art, is disposed in the supply container 22 which is connected by suitable hose means (not shown) to the spray heads, such as, spray head 78 shown in FIGS. 3 and 4. Each such spray head has its own valve 84. The lateral extension of the arms 14 and 16 is then adjusted, for example, hydraulically, so that when the tractor is driven along a line midway between the parallel rows of trees, the streaking elements 26 and 28, for example, are located for engagement with the trees 24 on both sides of the vehicle. The hydraulic motors 68 are actuated in a known manner to cause the endless chain members 49 to move in a substantially horizontal plane within the channel 70 of the chain guide bar 46. The vehicle 10 is then driven between the rows of trees 24, and the tree stems sequentially alternately engaged by the tree slashing elements 26 and 28. As indicated above, there may be a second pair of tree slashing elements provided so that slashes are made at two vertically related locations on the tree trunk. The speed of the tractor 10 is maintained at between 0.5 and 2.5 mph.

As indicated above, immediately after the slash or slashes are made in the trunk of the tree, irritant material is sprayed into the freshly cut wounds. Thereupon, the natural process of enhancement of oleoresinous material and rosin ensues. Experience has shown that from 6,000 to 7,000 trees may be treated with the apparatus of the present invention as opposed to about 1,000 trees by prior art means.

What is claimed is:

1. A tree slashing and treating apparatus carried by a wheeled vehicle and adapted to move continuously between parallel rows of trees and comprising a pair of oppositely laterally extending telescoping arms secured at their respective proximal extremities to said vehicle, means coacting with each of said telescoping arms for extending and retracting said arms, each of said arms having pivotally secured at its distal extremity chain saw tree slashing means for slashing a tree to remove a strip of bark and exposed an under bark portion of the tree, said chain saw means including an endless saw chain and spaced sprockets mounted respectively on vertical shafts and disposed for movement of the chain around said sprockets in a horizontal plane, means coacting between each of said arms and the respective chain saw means pivotally mounted thereon for restoring said chain saw means from a tree-deflected position to a normal tree-intercepting position after said vehicle has passed a deflecting tree, actuator means and liquid delivery means, respectively carried by each said chain saw tree slashing means said actuator means being vertically displaced from said tree slashing means and adapted to contact the trunk of the tree for causing a liquid treating agent to be applied through said liquid delivery means to said exposed under bark portion.

2. A tree slashing and treating apparatus as defined in claim 1 wherein said chain is carried in a chain guide bar.

3. A tree slashing and treating apparatus as defined in claim 1 wherein said tree slashing means includes means for driving said movable chain.

4. A tree slashing and treating apparatus as defined in claim 3 wherein said driving means is a hydraulic motor.

5. A tree slashing and treating apparatus as defined in claim 1 wherein said liquid delivery means includes a supply line, a treating agent supply, and a valve in said supply line to control the movement of treating agent therethrough, and means responsive to contact with a tree for actuating said valve from a normally closed position to an open position.

6. A tree slashing and treating apparatus as defined in claim 5 wherein the tree contacting means is a wheel fixedly mounted on a cam, a cam follower coacting between said cam and said valve, said cam being freely rotatable about the outermost sprocket shaft, and yieldable means for returning said cam to position said wheel in a tree trunk intercepting position.

* * * * *